UNITED STATES PATENT OFFICE.

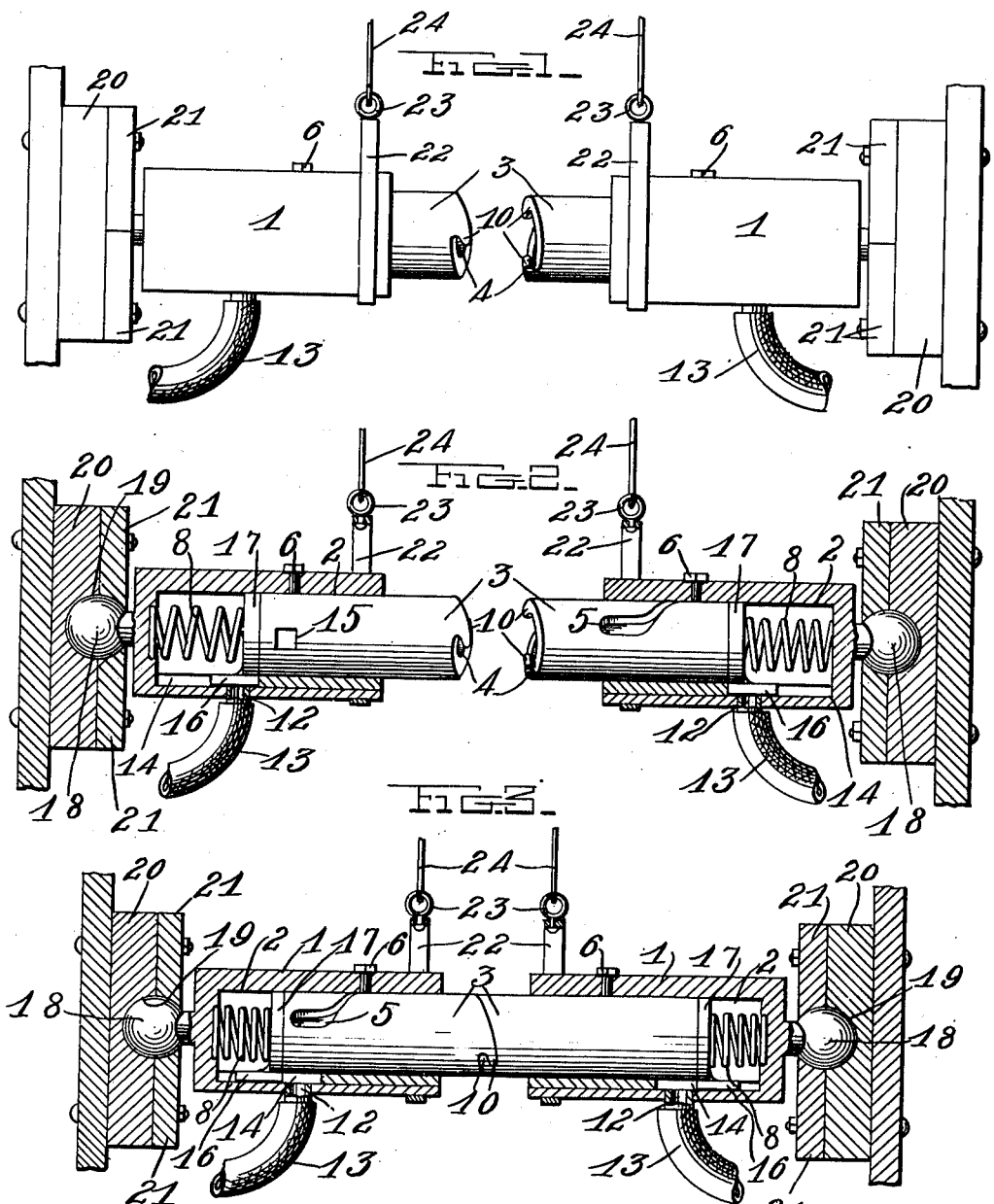

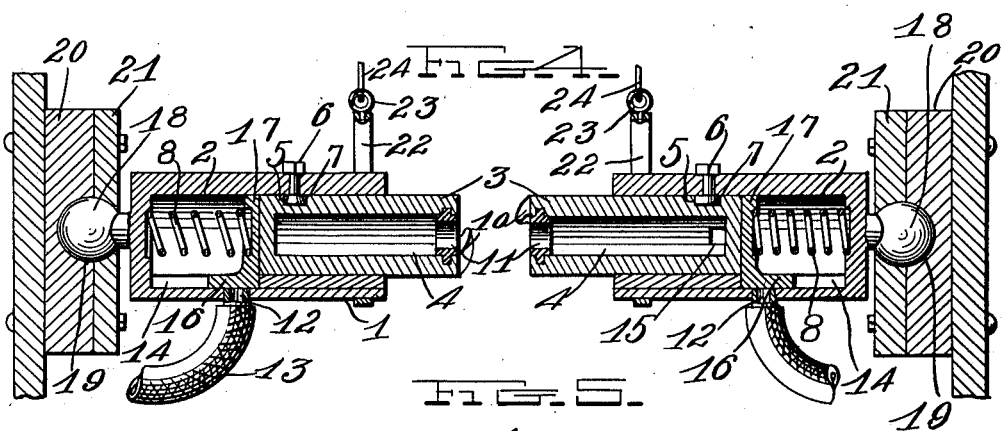
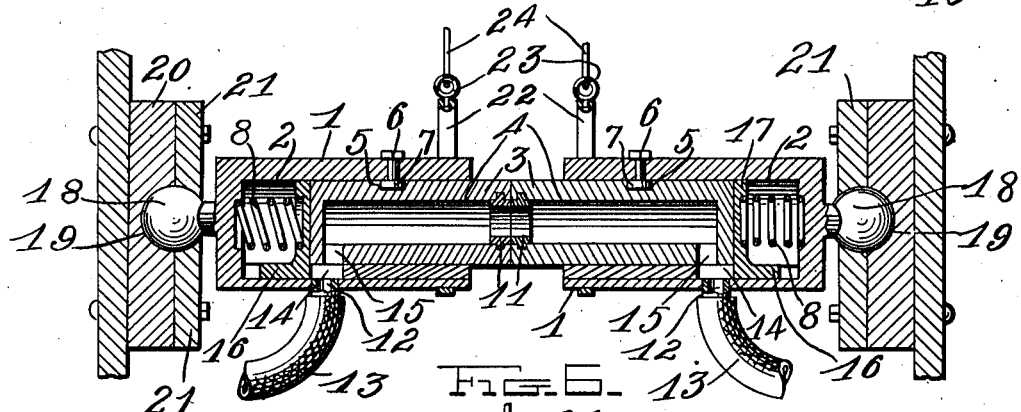
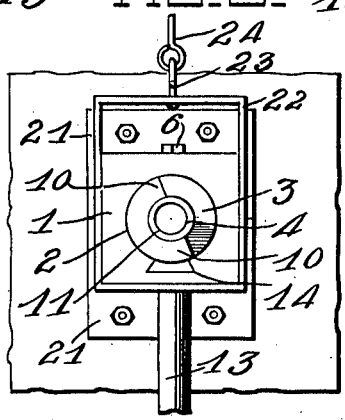

WILLIAM Z. PULLIAM AND FRANK VAN PELT, OF RANDSBURG, CALIFORNIA.

TRAIN-PIPE COUPLING.

992,059. Specification of Letters Patent. Patented May 9, 1911.

Application filed December 19, 1910. Serial No. 598,035.

*To all whom it may concern:*

Be it known that we, WILLIAM Z. PULLIAM and FRANK VAN PELT, citizens of the United States, residing at Randsburg, in the county of Kern and State of California, have invented certain new and useful Improvements in Train-Pipe Couplings; and we do declare the following to be a full, clear, and exact description of the invention, such as will enable others skilled in the art to which it appertains to make and use the same.

This invention relates to improvements in train pipe couplings.

One object of the invention is to provide a train pipe coupling which will automatically lock and form a fluid tight connection when the parts of the same are brought together under pressure and which will be automatically released when the pressure is removed.

Another object is to provide a coupling of this character having a fluid controlling valve which is automatically opened and closed when the members of the coupling are engaged and separated.

With these and other objects in view, the invention consists of certain novel features of construction, combination and arrangement of parts as will be more fully described and particularly pointed out in the appended claims.

In the accompanying drawings: Figure 1 is a side view of the coupling applied to the ends of two cars showing the members of the coupling separated. Fig. 2 is a vertical longitudinal section through the outer casing of the coupling members, showing the parts in uncoupled position; Fig. 3 is a similar view showing the parts in coupled position; Fig. 4 is a central longitudinal section of the coupling with the members in uncoupled position as shown in Figs. 1 and 2; Fig. 5 is a similar view showing the members in coupled position; Fig. 6 is an end view of a portion of a car and one of the coupling members.

The members of the improved coupling each consists of an outer casing 1 which is square or rectangular on its outer surfaces and is provided with a cylindrical socket 2 in which is slidably and revolubly mounted a cylindrical plunger 3 having a centrally disposed bore or passage 4. In one side of the plunger 3 is formed a cam groove 5 with which is adapted to be engaged a plunger revolving pin or bolt 6 which is arranged in the top of the casing 1 and is provided on its inner end with an anti-friction roller 7.

In the casing is arranged a coiled plunger projecting spring 8 whereby the plunger is yieldingly held in a projected position when the coupling is out of engagement with the adjoining coupling. On the outer end of the plungers 3 are formed spiral threads or projections 10 which, when the plungers are brought together and turned, will interlock and thus firmly connect the plungers together in coupled engagement. When the members of the coupling are brought together into forcible engagement the plungers 3 will be pushed back in the sockets 2 of the casing which movement will cause the pins or bolts 6 to engage the cam slots 5 to turn the plungers in the proper direction for bringing the spiral threads or projections on the outer ends thereof into interlocking engagement. When pressure is removed from the outer ends of the plungers the springs 9 will force the same outwardly which movement will cause the pins or bolts 6 to turn the plungers in a reverse direction thus unscrewing the threaded outer ends thereof, thereby allowing the ends of the plungers to separate. In the outer ends of the plungers are preferably arranged rubber gaskets or packing rings 11 which serve to provide a fluid tight connection between the ends of the plungers.

In the lower side of the casing 1 is formed a fluid inlet port 12 with which is connected the end of a flexible tube or hose 13 leading to the train pipe. The port 12 communicates with a dovetail shaped recess or valve seat 14 formed in the inner side of the casing. In one side of the inner end of the plunger is formed a transversely disposed port 15 which opens at its inner end in the passage 4 of the plunger and which, has its outer end brought into communication with the recess 14 when the plunger is pushed back and turned by the engagement of the cam groove 5 with the pin 6 as hereinbefore described.

When the couplers are in an uncoupled position and the plungers projected the ports 12 in the casings will be covered and closed by slide valves 16 which are slidably mounted in the recesses 14 and have formed thereon inwardly projecting stems or operating plates 17 which extend into the passages 4 of the casings and are disposed between the inner ends of the plungers and the adjacent ends of the springs whereby when the plungers are pushed back they will push the valves 16 back and thus open the ports 12 and when the plungers are projected by the springs the valves will be moved outwardly thus closing the ports. As hereinbefore stated, in the retracting movement of the plungers the same are turned to bring the ports 15 therein into register with the recesses 14 and it will be understood that this action occurring simultaneously with the retracting of the valves 16 will permit the fluid from the train pipe to pass through the ports 12 and 15 into the tubular plunger of one coupling and through the same and the plunger of the adjoining coupling thereby connecting the train pipes of the cars.

The coupling members may be attached to the end of the cars in any suitable manner and are here shown as having a universal joint connection therewith by means of a ball 18 formed on the end of the casing 1 and engaged with a socket 19 formed in a coupling head 20 arranged on the end of the cars. The balls 18 are held in operative engagement with the sockets 19 in the coupling heads 20 by means of plates 21 which are bolted or otherwise secured to the heads as shown. The outer ends of the coupling members are supported in position by supporting frames 22 in which are arranged swiveled rings 23 to which are connected the lower ends of supporting rods or cables 24, the upper ends of which are secured to any suitable part of the car.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention what we claim is:

1. In a train pipe coupling a pair of coupling members each of which comprises a casing having a closed end, a spring projected plunger slidingly and rotatably arranged therein, said plunger having a longitudinal passage, a locking device formed on the outer end of said plunger whereby when the plungers of the coupling members are brought together said ends will form an interlocking engagement, and means whereby the plungers are turned in said casings by the pressure of their engagement to lock the ends thereof together and whereby said ends will be released when the pressure is removed or the members disengaged.

2. In a train pipe coupling, a pair of coupling members each of which comprises a casing having a closed end, plungers mounted to turn in said casing, said plungers having formed therein fluid conducting passages, interlocking projections formed on the outer ends of said plungers whereby said ends will be locked when the same are brought into engagement, means whereby the plungers are turned when pushed back by their engagement with each other, springs arranged in said casings and disposed between the closed ends of the casings and plungers and adapted to force the latter outwardly when the pressure thereon is removed whereby the plungers will be turned in an opposite direction and the locking projections on the outer ends thereof released, and means whereby said casings are loosely connected to the ends of a car.

3. In a train pipe coupling a pair of coupling members each of which comprises a casing having formed on one side a train pipe connection, hollow plungers slidably and revolubly mounted in said casings, said plungers having formed therein cam grooves, a plunger revolving pin arranged in said casings, said pins having on their inner ends anti-friction rollers adapted to engage said grooves whereby when the plungers are pushed inwardly they will be revolved in one direction and when pushed outwardly will be revolved in the opposite direction, locking projections formed on the outer ends of said plungers and adapted to be operatively engaged to lock said ends together when the plungers are brought into engagement and forced back in said casings, springs adapted to push said plungers outwardly and to hold the same in a projected position, when the pressure is removed thereby disengaging said locked ends, means to operatively connect said casings to the car and a valve arranged in said casings, and operated by the movement of said plungers whereby the flow of the liquid from the train pipe to the plungers is automatically controlled to permit the fluid to pass through the plungers when in a retracted and locked position and to cut off the flow of liquid when the plungers are in a projected or released position.

4. In a train pipe coupling a pair of coupling members each of which comprises a casing, a ball formed on the inner end of said casings, a socket arranged on the ends of the car and adapted to receive said ball whereby said casings are loosely connected to the cars and permitted to swing in any direction, supporting frames on the outer ends of said casings, means whereby said frames are suspended to hold said casings in position, plungers slidably and revolubly mounted in said casings, said plungers having formed therein fluid conducting passages and a fluid inlet port, packing rings arranged in the outer ends of said plungers, inter-locking connections formed on said outer ends, means whereby the plungers are revolved to operatively connect and lock the ends of the plungers together when brought into engagement and forced back in said casings, springs to project said plungers and turn the same in an opposite direction whereby the latter are disengaged when backward pressure thereon is removed, means to connect the train pipes with said casings and fluid controlling valves arranged in said casings and adapted to be automatically operated by the movement of said plungers to control the flow of fluid from the train pipes to said plungers.

5. In a train pipe coupling, a pair of coupling members, each of which comprises a casing having in one side a valve seat and a fluid inlet passage communicating therewith, a cylindrical tubular plunger slidably mounted in said casing said plunger having a fluid inlet port, means to revolve said plunger when pushed back thereby bringing the inlet port therein into register with the valve seat and inlet passage in said casing, a spring to force said plunger outwardly thereby moving said ports out of register, and a valve arranged in said seat and operated by the movement of said plunger to open and close the inlet passage in said casing.

In testimony whereof we have hereunto set our hands in presence of two subscribing witnesses.

WILLIAM Z. PULLIAM.
FRANK VAN PELT.

Witnesses:
E. B. MAGINNIS,
JAMES MONTGOMERY.